United States Patent [19]

Tajima et al.

[11] 3,941,912
[45] Mar. 2, 1976

[54] COPOLYMER LATEX AND PAPER COATING COMPOSITION THEREOF

[75] Inventors: Shigeru Tajima, Ashiya; Takeshi Shimamura, Niihama; Kojiro Matsumoto, Takarazuka; Sadao Sekiguchi, Ikeda; Tanoshi Yamagoshi; Kazumasa Fjieda, both of Niihama, all of Japan

[73] Assignee: Sumitomo Naugatuck Co., Ltd., Osaka, Japan

[22] Filed: Sept. 13, 1973

[21] Appl. No.: 396,923

[52] U.S. Cl........ 428/537; 260/29.7 H; 260/29.7 T; 260/80.7; 260/80.75; 260/80.76; 260/80.8; 260/80.81
[51] Int. Cl.² C08L 9/08; C08L 25/14; C08L 29/08; C08L 33/00
[58] Field of Search........ 260/29.7 T, 29.7 H, 80.7, 260/80.75, 80.76, 80.8, 80.81; 428/537

[56] References Cited
UNITED STATES PATENTS

| | | | |
|---|---|---|---|
| 3,095,320 | 6/1963 | Leitner | 260/29.7 H |
| 3,104,231 | 9/1963 | Fitch | 260/29.7 H |
| 3,142,654 | 7/1964 | Peterson et al. | 260/29.7 T |
| 3,344,103 | 9/1967 | Eilbeck et al. | 260/29.7 T |
| 3,404,116 | 10/1968 | Pueschner et al. | 260/29.7 T;29.7 |
| 3,422,038 | 6/1969 | Meyer et al. | 260/29.7 T X |
| 3,432,455 | 3/1969 | Rasicci | 260/29.7 T |
| 3,574,159 | 4/1971 | Fetter et al. | 260/29.7 T |

OTHER PUBLICATIONS

Noble, "Latex in Industry" (Rubber Age, 1953), pp. 555–557.
Chem. Abs. 66:3894u; 71:92728k.

*Primary Examiner*—Murray Tillman
*Assistant Examiner*—T. DeBenedictis, Sr.
*Attorney, Agent, or Firm*—Kaufman & Kramer

[57] ABSTRACT

A copolymer latex comprising 25 to 45 percent by weight of a conjugated diolefinic monomer, 3 to 40 percent by weight of an alkyl ester of unsaturated carboxylic acid, 1 to 5 percent by weight of a hydroxyalkyl-containing unsaturated monomer, 0.5 to 4 percent by weight of an unsaturated carboxylic acid monomer and the remaining percent of an alkenyl aromatic monomer, and a pigmented paper coating composition, which can give a coated paper having excellent properties, such as water resistance, "transferability of multicolor offset printing ink" and blister resistance in case of web offset printing.

5 Claims, 1 Drawing Figure

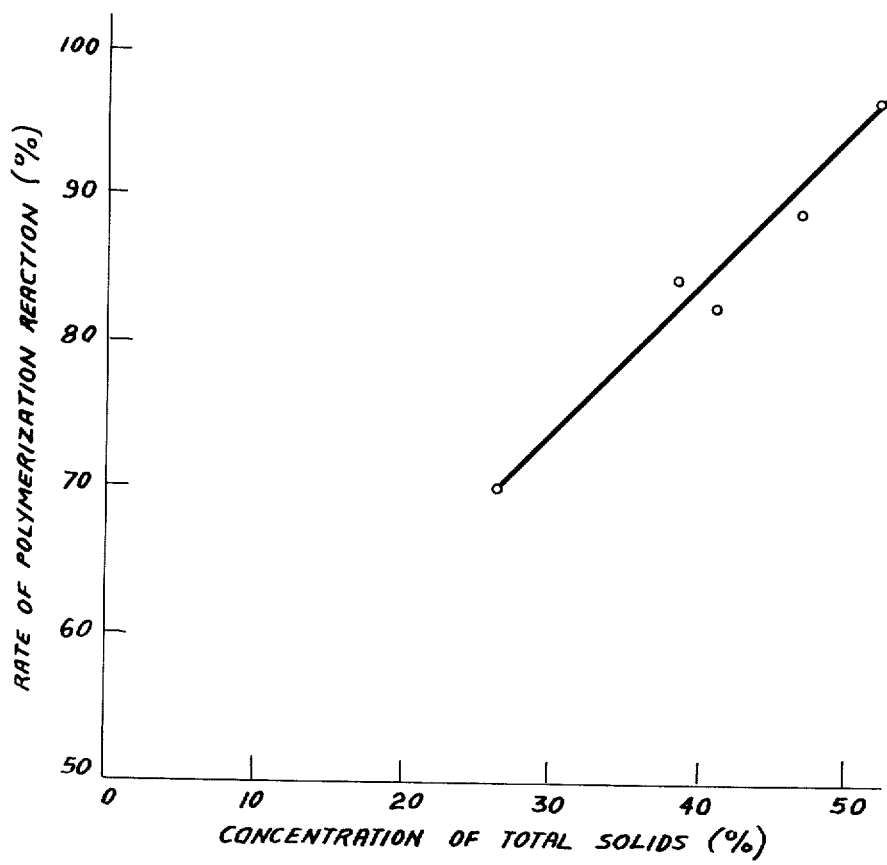

COPOLYMER LATEX AND PAPER COATING COMPOSITION THEREOF

The present invention relates to an improved conjugated diolefinic copolymer latex. More particularly, it relates to a copolymer latex comprising 25 to 45 percent by weight of a conjugated diolefinic monomer, 3 to 40 percent by weight of an alkyl ester of unsaturated carboxylic acid, 1 to 5 percent by weight of a hydroxyalkyl-containing unsaturated monomer, 0.5 to 4 percent by weight of an unsaturated carboxylic acid monomer and the remaining percent of an alkenyl aromatic monomer.

An aqueous latex has been usually used for paper coating either alone or together with various pigments, adhesives or the like. For the preparation of coating composition having excellent properties, it is generally required to have excellent stability against mechanical shear in the way of polymerization step or coating step and excellent chemical stability in case of mixture with various pigments or the like, and further to have enough adhesion strength and water resistance. Moreover, for adapting to the up to date paper coating technique and printing technique in higher level, the latex has been required to have more excellent properties, that is, it has been required not only to have excellent chemical and mechanical stability, but also to have some characteristics that the coating color is heat-stable and further the coated paper is excellent in adhesion strength and water resistance and also in "transferability of multicolor offset printing ink" as mentioned hereinafter and in blister resistance in case of web offset printing.

Recently, it has been described in U.S. Pat. No. 3,404,116 that there could be prepared a conjugated diolefinic latex having improved tolerance for electrolytes and shear stability by copolymerizing a half-ester of an aliphatic diol and an $\alpha,\beta$-ethylenically unsaturated aliphatic monocarboxylic acid (e.g. $\beta$-hydroxyethyl acrylate) and others, and that the latex can give a protein-containing coating color having reduced viscosity. However, the half-ester of an aliphatic diol and an $\alpha,\beta$-ethylenically unsaturated aliphatic monocarboxylic acid contains generally hydroxy group in the molecule and therefore is highly hydrophilic. Accordingly, when the copolymerization is carried out by using the half-ester in much amount enough to show the desired effect, it functions as a thickening agent and therefore, it tends to give a latex having high viscosity which is difficult to be handled. And further, the latex gives coating composition having lower adhesion strength and water resistance and the transferability of multicolor offset printing ink is also lowered. On the other hand, when the half-ester is used in smaller amount, there are not given the desired properties, such as tolerance for electrolytes and shear stability and reduced viscosity of the protein-containing coating colors.

It has been studied to find an improved latex having no defects as observed in the conventional latexes and a excellent coated paper, and then it has now been unexpectedly found that by copolymerizing a conjugated diolefinic monomer by using together a hydroxyalkyl-containing unsaturated monomer and an alkyl ester of unsaturated carboxylic acid there can be obtained a conjugated diolefinic latex having no such defects, and further that the viscosity of the latex is lowered; the viscosity in case of the preparation of pigmented composition and the heat stability are improved; and further the transferability of multicolor offset printing ink and the light resistance thereof are also improved.

An object of the present invention is to provide an improved conjugated diolefinic copolymer latex useful for paper coating.

Another object of the invention is to provide a coated paper for offset printing, which has excellent properties, such as water resistance, transferability of multicolor offset printing ink and blister resistance in case of web offset printing.

A further object of the invention is to provide a method for obtaining a printing paper having no such defects as observed in the conventional one, such as difficulty in handling of the latex and heat stability of the coating color in the way of pigment coating step, by using a copolymer latex. The heat stability of the coating color is particularly important since the speed for production of coated paper in on-machine system has been become so higher.

According to the present invention, the desired latex is prepared by copolymerizing 25 to 45 percent by weight of a conjugated diolefinic monomer, 3 to 40 percent by weight of an alkyl ester of unsaturated carboxylic acid, 1 to 5 percent by weight of a hydroxyalkyl-containing unsaturated monomer, 0.5 to 4 percent by weight of an unsaturated carboxylic acid monomer and the remaining percent of an alkenyl aromatic monomer and the latex may be used for paper coating.

The copolymer latex of the present invention may be prepared by a conventional emulsion polymerization and there is no particular limitation to the manner of addition of the monomers and they may be added at one time at the first stage of the reaction or may be added continuously or incrementally while the polymerization reaction.

The conjugated diolefinic monomer used in the present invention has 4 to 10 carbon atoms, and may be, for instance, 1,3-butadiene, 2-methyl-1,3-butadiene, 2-chloro-1,3-butadiene, a conjugated pentadiene having straight chain which may have a substituent, and a conjugated hexadiene having straight or branched chain which may have a substituent. The conjugated diolefinic monomer may be used in a range of 25 to 45 percent by weight. When it is used in an amount of less than 25 percent by weight, the product can not be given enough elasticity nor enough adhesion strength, and on the other hand, when it is used more than 45 percent by weight, the product becomes soft and shows sticky and the water resistance thereof becomes lower.

The suitable examples of the alkyl ester of unsaturated carboxylic acid may be methyl acrylate, methyl methaacrylate, ethyl acrylate, ethyl methacrylate, butyl acrylate, cyclohexyl acrylate, glycidyl methacrylate, dimethyl fumarate, dimethyl fumarate, dimethyl maleate, diethyl maleate, dimethyl itaconate, monomethyl fumarate, monoethyl fumarate, and the like. The alkyl unsaturated carboxylate monomer may be used in a range of 3 to 40 percent by weight. When it is used in an amount of less than 3 percent by weight, any effect can not be given, and on the other hand, when it is used more than 40 percent by weight, the product shows inferior adhesion strength and water resistance.

The hydroxyalkyl-containing unsaturated monomer may be a polymerizable monomer having at least one hydroxy group in the molecule, such as an ester of hydroxy-containing unsaturated carboxylic acid (e.g. ester of monocarboxylic, dicarboxylic or tricarboxylic acid), a vinyl ether monomer, an aromatic vinyl monomer, and a vinyl ketone monomer. The suitable examples may be β-hydroxyethyl acrylate, β-hydroxyethyl methacrylate, hydroxypropyl acrylate, hydroxypropyl methacrylate, hydroxybutyl acrylate, hydroxybutyl methacrylate, 3-chloro-2-hydroxypropyl methacrylate, di(ethylene glycol) itaconate, di(propylene glycol) itaconate, bis(2-hydroxypropyl) itaconate, bis(2-hydroxyethyl) itaconate, bis(2-hydroxyethyl) fumarate, bis(2-hydroxyethyl) maleate, 2-hydroxyethyl methylfumarate, 2-hydroxyethyl vinyl ether, hydroxymethyl vinyl ketone, allyl alcohol, or the like. These monomer may be used in a range of 1 to 5 percent by weight either alone or in a mixture of two or more kinds thereof. When it it used in an amount of less than 1 percent by weight, the effect can not be enough achieved, and on the other hand, when it is used more than 5 percent by weight, the emulsion polymerization is hardly proceeded and the product shows inferior water resistance.

As the unsaturated carboxylic acid monomer, there may be acrylic acid, methacrylic acid, fumaric acid, maleic acid, itaconic acid or the like. The monomer may be preferably used in a range of 0.5 to 4 percent by weight.

In the present polymerization, there may be further used an alkenyl aromatic monomer in the range of remaining percent (i.e. 6 to 70.5 percent by weight). The suitable examples may be styrene, α-methylstyrene, dimethylstyrene, chlorostyrene, vinyltoluene or the like.

In the present polymerization, there may be used any conventional emulsion polymerization methods. And further there may be added any other conventional ingredients, such as emulsifiers, chain transfer agents, polymerization initiators, various electrolytes, and chelating agents, which are usually used for giving the product excellent properties suitable for the preparation of coating composition. There is no limitation to the manner of addition of the ingredients, and there may be added at once at the first stage of the reaction or may be added continuously or incrementally while the polymerization reaction. However, for giving the best properties to the paper coating composition of the present invention, it is most preferable that an emulsifier is used in a ratio of 0.05 to 3.0 parts, preferably 0.1 to 2.0 parts by weight on the basis of 100 parts by weight of the monomer mixture, and that at least 30 percent by weight of the monomer mixture and at least 30 percent by weight of the emulsifier are continuously or incrementally added after the initiation of the polymerization reaction and after the concentration of the total solids becomes over 20 percent by weight in the polymerization system so that the concentration of the total solids of the polymer is maintained above 20 percent by weight and the rate of polymerization reaction is maintained above 50 percent.

"The rate of polymerization reaction" means $$R = \frac{A}{A + B}$$

$R$: rate of polymerization reaction
$A$: weight of polymer in the polymerization system (reactor)
$B$: weight of monomers in the polymerization system (reactor)

The present latex can be used for the preparation of pigmented paper coating composition, to which any conventional pigments may be added. As the pigments, there may be, for instance, kaolin, titanium dioxide, titanium white, barite, satin white, barium sulfate, calcium carbonate or the like. Furthermore, there may be added any other conventional ingredients used for coating composition, such as co-binders (e.g. starch, casein, or polyvinyl alcohol), lubricants (e.g. calcium stearate, ammonium stearate, or wax emulsion), cross linking agents (e.g. formalin, glyoxal, melamine-formalin resin, or urea-formalin resin), alkali stabilizers, anti-foaming agents, surface active agents, and the like. The latex and the pigments may be admixed with each other in a ratio of 2 to 50 parts, preferably 3 to 40 parts by weight (as a solid material) of the latex on the basis of 100 parts by weight of the pigments. Further, there may be used 50 or less parts by weight of co-binders and 20 or less parts by weight of lubricants on the basis of 100 parts by weight of the pigments, which can give more improved properties to the paper coated with the coating color. The stability of the coated paper can be enhanced by adding the cross linking agent and stabilizers.

The latex of the present invention has the following excellent properties which can be given by using a hydroxyalkyl-containing unsaturated monomer and an unsaturated carboxylic acid ester monomer in the polymerization.

That is, the present latex has the following characteristics:

1. it has excellent shear stability and electrolyte tolerance, and excellent chemical stability in case of mixture with various pigments, and
2. it is easily handled in case of its storage, transportation by pipe and admixture since the viscosity is low, and further the solid components can be increased.

The coating colors prepared by using the present lates have the following characteristics:

3. it is significantly stable, and is not gelated nor increases the viscosity even if it is heated, and
4. because of its excellent heat-stability, it can be applied in high speed on hot paper immediately after drying, as in case of on-machine coating.

Furthermore, the coated paper, which is applied with the coating color prepared by using the present latex, has the following characteristics:

5. it has excellent adhesion strength (RI-Dry Pick), and the adhesion strength is not lowered even if it is wetted with water, i.e. it has excellent water resistance (RI-Wet Pick),
6. it shows excellent transferability of ink onto paper, and particularly it is excellent in the transferability of multicolor offset printing ink,
7. it has excellent light resistance, and
8. it is excellent in blister resistance in case of web offset printing.

These effects of the present invention are explained in more detailed below.

With recent speed up of the offset printing and employing two-color printing press such as Rowland type, the transferability of second or further next color ink onto the paper, i.e. the printed ink density has been called into question. In multicolor offset printing process, some portion of the paper, at the first printing unit, may not be printed with ink consequently dampened or wetted with water and thereafter, at the next printing unit while the portion is still wet, it may be printed with ink. It is an important property whether the second or further next ink is easily transferred onto the said paper surface which is wetted at the beforegoing printing unit. In the present specification, this is called as transferability of multicolor offset printing ink. The receptivity of ink has generally been measured or evaluated by means of K & N ink receptivity or oil-absorbency. It has been, however, known that there is not necessarily correlation between the K & N ink receptivity and the transferability of multicolor offset printing ink. The transferability of multicolor offset printing ink has an important relation with the air permeability and water absorbency of the coated paper, and it has been considered as an another printing property than the ink receptivity onto the dry paper such as K & N ink receptivity. The said printing property, i.e. the transferability of multicolor offset printing ink is an essential factor for any pigmented coated paper in case of high speed multicolor offset printing, while it is out of the question in case of relief printing or the like.

The printing property can be evaluated by using RI type printing press as follows:

That is, a RI type four color printing property tester is used, and further a wet roll is used instead of third color printing roll without using first and second color rolls, and then water is supplied on a test paper piece by the wet roll. Immediately after, the resulting wet paper is printed by fourth color ink roll. The ink density on the printed paper thus obtained is evaluated by observation with naked eyes. The results of the evaluation are classified into five classes.

According to the evaluation method as mentioned above, the coated paper prepared by using the present latex showed most superior property. In the examples hereinafter, the transferability of multicolor offset printing ink was evaluated by the method mentioned above.

When a latex prepared by copolymerizing a conjugated diolefinic monomer with a hydroxyalkyl-containing unsaturated monomer is used, the coating color prepared therefrom generally shows improved chemical stability, but on the other hand, it results in lowering of the transferability of multicolor offset printing ink. On the other hand, when a latex is prepared without using a hydroxyalkyl-containing unsaturated monomer, it shows rather excellent transferability of multicolor offset printing ink, but is inferior in the chemical stability and therefore the latex could not be used for any composition containing a chemically unstable pigment such as satin white.

According to the present invention, by using together both hydroxyalkyl-containing unsaturated monomer and alkyl ester of unsaturated carboxylic acid, there can be obtained a conjugated diolefinic copolymer having excellent transferability of multicolor offset printing ink and further improved adhesion strength, water resistance, light resistance and latex viscosity without obstructing the chemical and mechanical stability. The present latex has further unexpectedly excellent property such as blister property in case of web offset printing. Accordingly, the present latex is highly valuable as a binder for the pigmented paper coating composition having high capacity which can be used even in the up-to-date high speed printing technique.

Moreover, the coating color prepared by using the present copolymer latex has excellent heat stability. When the coating color is used for C-2-S application (it means an application for both surface and reverse side of the paper) or double coating, it is usually necessary to apply the color onto hot paper immediately after drying, in both cases of onmachine coater and offmachine coater, and therefore the coating color tends to be heated. When a heat-unstable color is used, it is gelated and becomes to be highly viscous, which caused difficulty of coating thereof, and further the pick strength of the coated paper is sometimes significantly lowered because of insufficient dispersion of the coating color. With the recent progress of high speed coater, the heat stability of coating color is coming more important in addition to the chemical and mechanical stabilities.

The present invention is illustrated by the following examples, but not limited thereto. In the examples, the "parts" means parts by weight.

EXAMPLE 1

Into a reactor were added 45.9 parts of water, 30 percent by weight of an aqueous emulsion solution (lauryl sulfate 1 part and water 20 parts), 20 percent by weight of monomer mixture (butadiene 39 parts, styrene 51 parts, methyl methacrylate 6 parts, β-hydroxyethyl acrylate 2 parts and tert-dodecyl mercaptane 0.25 part), 1.5 parts of fumaric acid, 0.5 part of acrylic acid and 0.6 part of sodium bicarbonate, and then the mixture was heated. When the inner temperature became 65°C, an aqueous solution of potassium persulfate (potassium persulfate 1.0 part and water 26.8 parts) was further added. When the inner temperature became 70°C, the total solids of the polymer in the reactor was 22 percent. Then, the remaining monomer mixture and the aqueous emulsifier solution were continuously added over a period of 7 hours.

The FIG. 1 shows the relationship of the concentration of total solids and the rate of polymerization reaction while the continuous addition.

The polymerization reaction was finished for 13 hours to give a latex having 0.06 percent by weight of coagulum (i.e. the ratio of the dried residue which is obtained by filtration with 100 mesh screen to the amount of latex in wet state) and 1600 to 1900 Å of particle size.

When the polymerization reaction was carried out in the same manner as described above excepting that the total amount of the emulsifier was added at once at the first stage of the reaction and only the monomers were continuously added, there was obtained a latex having 0.5 percent by weight of coagulum and 600 to 900 Å of particle size.

EXAMPLE 2

Latexes of the invention (A, B and C) were prepared by copolymerizing a mixture of monomers according to a conventional emulsion copolymerization method. Likewise, as the controls, some latexes (D, E and F) were prepared. The kinds and amount (part) of the monomers are shown in Table 1.

Table 1

| Kind of monomers | Latex of this invention on | | | Latex of controls | | |
|---|---|---|---|---|---|---|
| | A | B | C | D | E | F |
| Butadiene | 32.5 | 36.5 | 30.0 | 37.0 | 40.0 | 38.0 |
| Styrene | 30.5 | 47.0 | 50.5 | 58.0 | 54.5 | 59.0 |
| β-Hydroxyethyl acrylate | 4.0 | 4.0 | 2.0 | — | 3.0 | — |
| Methyl methacrylate | 30.5 | 10.0 | 15.0 | 2.0 | — | — |
| Acrylic acid | 2.5 | 0.5 | 1.5 | 1.0 | 0.5 | 1.0 |
| Fumaric acid | — | 2.0 | 1.0 | 2.0 | 2.0 | 2.0 |

The viscosity of the latexes shown in Table 1 (total solids: 48 percent, pH: 6.5) was measured. The results are shown in Table 2. As made clear from the results, the latexes of the present invention have lower viscosity than those of controls.

| | A | B | C | D | E | F |
|---|---|---|---|---|---|---|
| Viscosity of latexes (cps) | 70 | 95 | 60 | 240 | 380 | 410 |

Table 2

By using the above latexes, there were prepared casein-containing coating color (Formulation I) and Satin white-containing coating color (Formulation II) as shown in the following Table 3. In both formulation, the total solids were included in 50 percent by weight.

Table 3

| Components of Formulation I | | Components of Formulation II | |
|---|---|---|---|
| Kind | Part | Kind | Part |
| Kaolin clay | 70 | Kaolin clay | 90 |
| Calcium carbonate | 30 | Satin white | 10 |
| Zinc oxide | 1 | Oligomer dispersing agent (e.g. Aron 20 SL) | 0.5 |
| Casein | 10 | | |
| Latex | 15 | Modified starch (Tradename: Neal gum A-220) | 8 |
| | | Latex | 10 |

The characteristics of the above Formulation I and Formulation II were evaluated as follows:
1. Re: Formulation I
The properties of the coating color are as shown in Table 4. The latexes of the present invention (A, B and C) had lower viscosity of color and excellent viscosity stability after kept for 24 hours in comparison with the latexes of controls (D, E and F).

Table 4

| | A | B | C | D | E | F |
|---|---|---|---|---|---|---|
| Viscosity immediately after preparation (cps) | 3,650 | 3,530 | 3,320 | 6,530 | 7,260 | 8,400 |
| pH value immediately after preparation | 9.3 | 9.3 | 9.2 | 9.3 | 9.3 | 9.4 |
| Viscosity 24 hours after preparation (cps) | 5,260 | 4,410 | 4,830 | 35,000 | 37,000 | 43,000 |
| Viscosity stability* | 1.44 | 1.25 | 1.45 | 5.36 | 5.10 | 5.12 |

[Note]:
*Viscosity 24 hours after preparation / Viscosity immediately after preparation The properties of the coated paper are as shown in Table 5. The RI-Dry Pick, RI-Wet Pick and transferability of multicolor offset printing ink were evaluated by observing the degree of picking and the density of ink by naked eyes and the result being classified into five classes from 1 (best) to 5 (worst). The light resistance test was carried out by measuring the degree of yellowing after irradiation with Fade-O'meter for 20 hours. The degree of yellowing was calculated by the following expression:

$$(A - B) / G$$

wherein $A$, $B$ and $G$ means the reflectivity which was measured by using Hunter colorimeter (Amber filter, Blue filter and Green filter, respectively).

As made clear from the results shown in Table 5, the papers coated with the present latexes (A, B and C) showed excellent adhesion strength and water resistance, and also excellent light resistance (i.e. lower degree of yellowing) in comparison with those coated with the latexes of controls.

Table 5

| | A | B | C | D | E | F |
|---|---|---|---|---|---|---|
| RI-Dry Pick | 1.2 | 1.4 | 1.2 | 2.0 | 2.0 | 2.0 |
| RI-Wet Pick | 1.0 | 1.5 | 1.5 | 3.0 | 2.0 | 3.0 |
| Transferability of multicolor offset printing ink | 1.5 | 2.0 | 1.0 | 3.0 | 5.0 | 3.0 |
| Light resistance | 0.105 | 0.121 | 0.110 | 0.140 | 0.146 | 0.150 |

2. Re: Formulation II
The properties of the coating color are as shown in Table 6. The present latexes (A, B and C) showed superior heat stability of coating color in comparison with other latexes.

Table 6

|  | A | B | C | D | E | F |
| --- | --- | --- | --- | --- | --- | --- |
| Viscosity immediately after preparation (cps) | 740 | 720 | 760 | 820 | 800 | 790 |
| pH value immediately after preparation | 11.0 | 11.0 | 11.1 | 10.9 | 11.0 | 11.0 |
| Viscosity after heating at 70°C for 15 minutes (cps) | 980 | 1,230 | 1,430 | 3,050 | 2,550 | gelated |

The properties of the coated paper are as shown in Table 7. The papers coated with the present latexes (A, B and C) were excellent in RI-Wet Pick and transferability of multicolor offset printing ink in comparison with those coated with other latexes.

Table 7

|  | A | B | C | D | E | F |
| --- | --- | --- | --- | --- | --- | --- |
| RI-Wet Pick | 1.0 | 1.5 | 1.5 | 3.0 | 2.0 | 4.0 |
| Transferability of multicolor offset printing ink | 2.0 | 2.0 | 1.0 | 3.0 | 5.0 | 3.0 |

The RI-Dry Pick was measured on the papers coated with heat-treated coating color and untreated coating color. The results are shown in Table 8.

The coated papers by using present latexes (A, B and C) were superior in RI-Dry Pick not ony in case of using untreated coating color but also in case of heat-treated coating color in comparison with those of other latexes.

Table 8

| Coating color | A | B | C | D | E | F |
| --- | --- | --- | --- | --- | --- | --- |
| Untreated | 1.0 | 1.5 | 1.5 | 4.5 | 2.0 | 3.0 |
| Heat-treated at 70°C for 15 minutes | 1.0 | 1.5 | 2.0 | 5.0 | 3.0 | — |

The blister resistance was measured as follows:

As the test paper there was used the paper coated with the coating color of Formulation II in one side and further coated with pigment containing many amount of adhesive in the reverse side. The reverse side was previously printed and dried, and then the paper was seasoned so as to be about 5.5 percent of humidity. The side to be tested was printed with commercial web offset printing ink, and then the paper was heated in an electric heating furnace. The critical blister temperature (i.e. the lowest temperature at which blister occurs) was measured. The results are shown in Table 9.

When the critical blister temperature is higher, the paper can be used for web offset printing at higher speed. As made clear from the results shown in Table 9, the papers using the present latexes (A, B and C) showed better blister resistance.

Table 9

|  | A | B | C | D | E | F |
| --- | --- | --- | --- | --- | --- | --- |
| Critical blister temperature (°C) | 210 | 200 | 190 | 180 | 170 | 180 |

What is claimed is:

1. A copolymer latex comprising 25 to 45 percent by weight of a conjugated diolefinic monomer, 3 to 40 percent by weight of an alkyl ester of an unsaturated carboxylic acid, selected from the group consisting of methyl methacrylate, methyl acrylate, ethyl acrylate, ethyl methacrylate, butyl acrylate, cyclohexyl acrylate, glycidyl methacrylate, dimethyl fumarate, diethyl fumarate, dimethyl maleate, diethyl maleate, dimethyl itaconate, monomethyl fumarate, monoethyl fumarate and mixtures thereof, 1 to 5 percent by weight of a hydroxyalkyl-containing unsaturated monomer selected from the group consisting of β-hydroxyethyl acrylate, β-hydroxyethyl methacrylate, hydroxypropyl acrylate, hydroxypropyl methacrylate, hydroxybutyl acrylate, hydroxybutyl methacrylate, 3-chloro-2-hydroxypropyl methacrylate, di(ethylene glylcol) itaconate, di(propylene glycol) itaconate, bis(2-hydroxypropyl) itaconate, bis(2-hydroxyethyl itaconate, bis(2-hydroxyethyl) fumarate, bis(2-hydroxyethyl) maleate, 2-hydroxyethyl methylfumarate, 2-hydroxyethyl vinyl ether, hydroxymethyl vinyl ketone, allyl alcohol and mixtures thereof, 0.5 to 4 percent of an unsaturated carboxylic acid monomer and the remaining percent of an alkenyl aromatic monomer.

2. A paper coating composition comprising a pigment and a copolymer latex as according to claim 1.

3. The paper coating composition according to claim 2, wherein the polymer latex is used in a ratio of 2 to 50 parts by weight on the basis of 100 parts by weight of the pigment.

4. A coated paper comprising a paper sheet to which the paper coating composition as set forth in claim 2 is applied.

5. A process for production of the copolymer latex according to claim 1 by polymerizing the monomers, which process is characterized in that an emulsifier is used in a ratio of 0.05 to 3.0 parts by weight on the basis of 100 parts by weight of the monomers and that at least 30 percent by weight of the monomers is continuously or incrementally added, after the initiation of the polymerization reaction and after the concentration of the total solids of the polymer becomes over 20 percent by weight in the polymerization system, so that the concentration of the total solids is maintained above 20 percent by weight and the rate of polymerization reaction is maintained above 50 percent.

* * * * *

PO-1050
(5/69)

UNITED STATES PATENT OFFICE
CERTIFICATE OF CORRECTION

Patent No. 3,941,912        Dated March 2, 1976

Inventor(s) Shigeru Tajima et al

It is certified that error appears in the above-identified patent and that said Letters Patent are hereby corrected as shown below:

In the Claims:

Claim 1, line 22, after "4 percent" insert --by weight--.

Signed and Sealed this

Nineteenth Day of October 1976

[SEAL]

Attest:

RUTH C. MASON
*Attesting Officer*

C. MARSHALL DANN
*Commissioner of Patents and Trademarks*